United States Patent
Novak et al.

(10) Patent No.: US 9,542,160 B2
(45) Date of Patent: Jan. 10, 2017

(54) SYSTEM AND METHOD FOR SOFTWARE DEVELOPMENT REPORT GENERATION

(75) Inventors: Miroslav Novak, Prague (CZ); Albert Regner, Karlovy Vary (CZ); Vladimir Dubsky, Podebrady (CZ)

(73) Assignee: Hewlett Packard Enterprise Development LP, Houston, TX (US)

( * ) Notice: Subject to any disclaimer, the term of this patent is extended or adjusted under 35 U.S.C. 154(b) by 1495 days.

(21) Appl. No.: 12/916,445

(22) Filed: Oct. 29, 2010

(65) Prior Publication Data

US 2012/0110544 A1    May 3, 2012

(51) Int. Cl.
*G06F 9/44* (2006.01)
*G06F 11/36* (2006.01)
*G06Q 10/06* (2012.01)

(52) U.S. Cl.
CPC . *G06F 8/20* (2013.01); *G06F 8/70* (2013.01); *G06F 11/3672* (2013.01); *G06Q 10/06* (2013.01)

(58) Field of Classification Search
None
See application file for complete search history.

(56) References Cited

U.S. PATENT DOCUMENTS

| | | |
|---|---|---|
| 2004/0143811 A1 | 7/2004 | Kaelicke et al. |
| 2005/0151739 A1* | 7/2005 | Barrett et al. ............. 345/440.2 |
| 2006/0015519 A1 | 1/2006 | LaBrosse |
| 2006/0070020 A1* | 3/2006 | Puttaswamy et al. ........ 717/101 |
| 2006/0123389 A1* | 6/2006 | Kolawa et al. .............. 717/101 |
| 2007/0250368 A1 | 10/2007 | Outland |
| 2008/0140490 A1 | 6/2008 | Wang et al. |
| 2009/0006147 A1 | 1/2009 | Padmanabhan |
| 2009/0217234 A1 | 8/2009 | Chen |
| 2010/0017784 A1* | 1/2010 | O'Mahony et al. .......... 717/101 |

* cited by examiner

*Primary Examiner* — Lewis A Bullock, Jr.
*Assistant Examiner* — Mark Gooray
(74) *Attorney, Agent, or Firm* — Pearl Cohen Zedek Latzer LLP

(57) ABSTRACT

A computer implemented method includes extracting requirement data from a software development system, the requirement data defining a software development requirement during a predetermined period of time. The method further includes extracting from the software development system an indication of a state of software development at the beginning of the period of time, and an indication of a state of software development at the end of the period of time. The method further includes calculating a change in the state of software development during the period of time and generating a report that enables comparing the calculated change in the state of software development with the software development requirement. A computer readable medium product and a data processing system are also disclosed.

20 Claims, 3 Drawing Sheets

SYSTEM AND METHOD FOR SOFTWARE DEVELOPMENT REPORT GENERATION

BACKGROUND

Software development may take place under an integrated development environment (IDE). An IDE may provide a set of integrated tools that can enable a software development team to perform functions that may be part of a software development effort. These tools may enable a developer to perform functions such as editing code, designing user interfaces, compiling and/or interpreting code, building an application, debugging, and/or coordinating versions and changes among members of a development team. The IDE may enable cooperation among the various tools.

Use of an IDE may assist in increasing the effectiveness of software development. Effective software development may deliver a high quality software product in a minimum amount of time. The features of an IDE may be designed so as to increase software development effectiveness.

BRIEF DESCRIPTION OF THE DRAWINGS

Reference is made to the accompanying drawings, in which.

DETAILED DESCRIPTION

Figure 1:
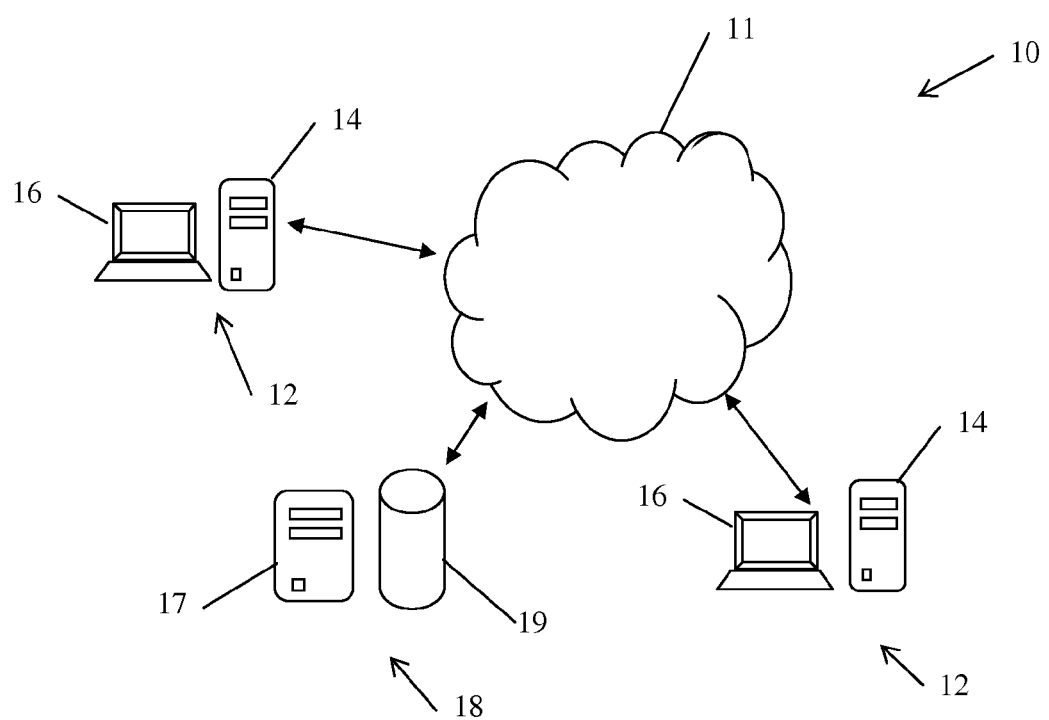
FIG. 1 shows a system for software development report generation in accordance with an embodiment of the invention.

In accordance with an embodiment of the invention, a software development system, for example an IDE may include a capability to generate a software development report. This report generation capability may enable a user of the IDE to compare an actual state of software development with a required state of software development.

Report generation in accordance with an embodiment of the invention may include extracting requirement data from an appropriate repository associated with the IDE. The requirement data may be stored in the form of a data object. The requirement data may include a description of the requirement, a priority, a milestone, an identification of a responsible developer or development team, associated documents, identification of parent and child requirements, implementation components, relationships with or dependencies on other requirements, and/or an identifying name or number of the requirement.

The IDE may provide an appropriate user interface for enabling a user to enter requirement data to be stored in the repository. The IDE may also include an application for automatically generating data to be stored on the basis of other entered data. In accordance with an embodiment of the invention, the application may automatically identify a dependency of one requirement on another (or more) requirement(s).

A requirement may be associated with a particular period of time and/or a particular development phase. A requirement may indicate that a particular software component be written before a predetermined date and/or before occurrence of a predetermined milestone event.

Requirement data may be associated with a scheduling component of the IDE. A scheduling component may enable a user to schedule tasks based on such data as identification of tasks or milestones, personnel assigned to each task, and/or time allotted to each task Report generation in accordance with an embodiment of the invention may include determining and/or obtaining an indication of software development status. A value of a metric that may indicate status may be extracted from a component associated with the IDE. Values of the metric at the beginning and end of a particular period of time and/or development phase may be determined. A difference between values of the metric at the beginning and/or end of the period or phase may indicate a change in development status or development progress during the course of that period or phase.

The requirement data and the metric data may be presented together as part of a report. The report may be presented in an interactive format. The interactive format may enable a user to at least partially control which data is selected for presentation, and how the data is presented. User interaction with the presented report may, for example, determine the level of detail of presented information, the form of the presentation (e.g., table, graph, etc.), and/or the items to be presented. An interactive user interface may enable the user to navigate among the various presentation options. As the user navigates among the options, the report generator may select among pre-calculated values and/or results for display. The report generator may calculate any required values and/or results when such values or results are selected for display.

In accordance with an embodiment of the invention, a software development report generation as part of an IDE may, in effect, enable closer coordination between software development and software quality control. Closer coordination may enable improved identification of potential problems before they occur, and/or detection of problems at an earlier stage.

Automatic generation of a software development report (in comparison to manual report generation) may reduce demands on human resources. Automatic generation of software development reports may enable substantially immediate generation of the report (e.g., seconds to minutes, depending on system resources). Manual generation of a similar report, on the other hand, may require hours or days. Thus, the status indicated by an automatically generated report in accordance with an embodiment of the invention may be more current than that indicated by a manually generated report. An automatically generated report may eliminate inaccuracies caused by misreading, misinterpreting data, and/or human bias.

Report generation in accordance with an embodiment of the invention, may include generating one or more of several types of reports. Types or reports may include, for example, a feature/requirement report, a developer comparison report, an unplanned changes (or rogue development) report, and/or a defect prioritization report.

A feature/requirement report may include information regarding the status of software development organized with respect to development of various required features of the software. The report may, for example, enable a user to determine progress in developing a feature relative to scheduled and/or required progress. The feature/requirement report may include, for example, information regarding measured defects in the software, software testing status, and/or amount and quality of developed code.

A developer comparison report may enable comparison among the performance of various developers and/or teams of developers. The developer comparison report may include information regarding the status of software development organized with respect to the developers and/or teams of developers assigned to develop the software. The developer comparison report may enable extracting a representative performance of teams of developers assigned to develop a component and/or aspect of the software.

An unplanned change (or rogue development) report may enable display of software development that deviates from the requirements. the unplanned change (or rogue development) report may identify a change in the software that cannot be identified with a requirement. Such a change may indicate, for example, that a feature is being developed that was not required, or that the requirements were insufficient or inconsistent.

A defect prioritization report may enable display of identified defects in the developed software. The defect prioritization report may compare the identified defects with the requirements. The comparison of defects with requirements may enable assigning relative priorities to the defects.

FIG. 1 shows a system for software development report generation in accordance with an embodiment of the invention. Software development report generation system 10 may include one or more stations 12. Station 12 may include processor 14 and input/output device 16. Processor 14 may include a computer that is configured to run a component of the IDE. Input/output device 16 may include a display screen, an alphanumeric input device (e.g. a keyboard or keypad), and/or a pointing device.

Software development report generation system 10 may include network 11. Network 11 may be configured to enable communication and data transfer among stations 12 or from station 12 to server 18. For example, network 11 may include a network dedicated to the IDE. Network 11 may also be a general purpose electronic communication network—e.g., an intranet, the Internet, a telephone network, a combination thereof, etc.

Server 18 may include a server processor 17 and data storage device 19. Server processor 17 and data storage device 19 may each include a plurality of cooperating processors and data storage devices.

Server processor 17 may be configured to host an IDE application accessible by remotely located station 12. Data storage device 19 may include various data repositories associated with the IDE application. Alternatively, the functionality of server 18 may be incorporated into station 12, or distributed among a plurality of stations 12.

In accordance with an embodiment of the invention, input/output device 16 of station 12 may request generation of a report. Station 12 may then communicate this request via network 11 to server 18. A request for generation of a report may cause server 18 to obtain requirements and/or development status data from data storage device 19 or one or more stations 12. The obtained data may be compiled into a report by server 18, or may be sent to station 12 for compilation into a report. The generated report may be presented by a component of input/output device 16 of station 12 to which the report or data were sent.

Figure 2:
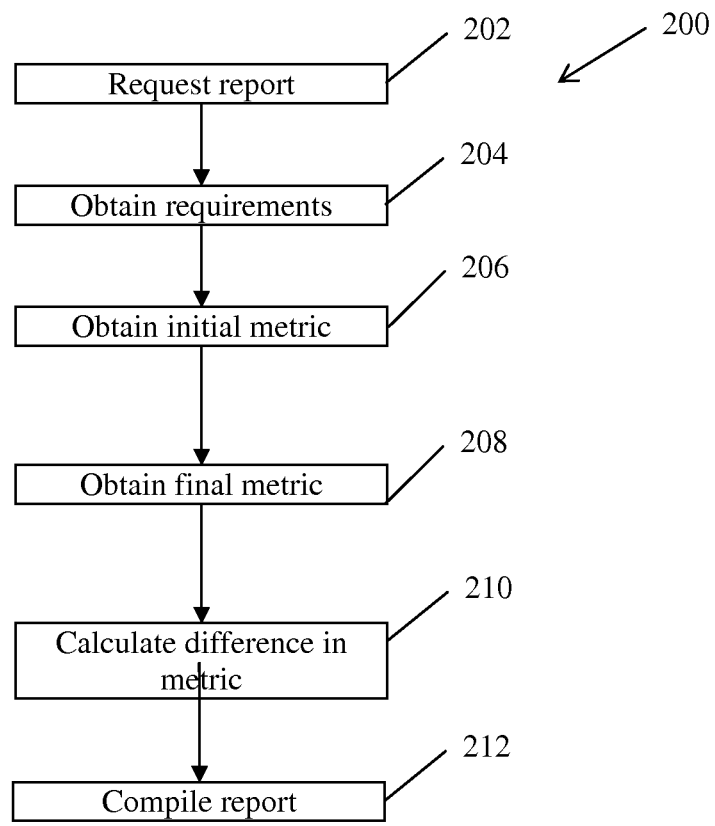
FIG. 2 shows a flowchart of a method for software development report generation in accordance with an embodiment of the invention.

FIG. 2 shows a flowchart of a method for software development report generation in accordance with an embodiment of the invention. Reference is also made to components of the system shown in FIG. 1. It should be understood with regard to this flowchart, and with regard to all flowcharts herein described, that the division of the method into discrete steps is for convenience and clarity only. Alternative division of the method into steps is possible with equivalent results, and all such equivalent divisions into should be understood as included within the scope of embodiments of the invention. The order of the steps illustrated in the flowcharts is selected for the sake of convenience and of clarity. Steps of the method may be performed concurrently or in an alternative order with equivalent results unless specifically identified otherwise. Such reordering of the steps should be understood as included within the scope of embodiments of the invention.

A user may initiate software development report generation method 200 by operating input/output device 16 of station 12 to request generation of a software development report (step 202). Alternatively, server processor 17 of server 18 or processor 14 of station 12 may be configured to request generation of a software development report under predetermined conditions. Such conditions may include predetermined times (e.g., beginning and/or end of a scheduled work day or shift, calendar periods, etc.), or scheduled or occurring events of software development (e.g., beginning and/or end of development phase, completion of a milestone, etc.).

The request may include an indication of request contents of the report. The request may indicate a type of report (e.g., feature/requirement report, developer comparison report, an unplanned/rogue development report, defect prioritization report, etc.), a project, a time period or phase, and/or a developer. The request may also include a selection of particular results or information to be displayed or emphasized in the report.

A user interface for generating a software development report may be configured in accordance with an embodiment of the invention to restrict one or options for report generation based on the current user's role in the development. Supervisory personnel may be able to generate any type of report regarding any supervised project. A developer may be restricted to generating reports related to a project to which the developer was/is assigned, or that developer's tasks (or related tasks). The user interface may be context sensitive. For example, when requesting a report from a user interface display that is related to a particular project, report generation may be restricted to that project.

The request may also provide a criterion or filter for determining what data is to be included in a report. The report may be limited to displaying information whose priority is greater than a specified threshold.

In accordance with an embodiment of the invention, a user interface may present a list of projects. Each project may be accompanied by summary data related to the project. A user may then select a project from the list. Upon selection of the project, the user interface may then present one or more lists or menus of options related to the selected project. The lists or menus may include a list of developers, a list of tasks or features, a list (or time line) of dates or phases, and/or a list of metrics for indicating software development status. The user may then select options from the lists in order to define the contents of the requested report.

Software development report generation method 200 may include obtaining requirement information or data (step 204). Data regarding all or some of the requirements related to a selected project or developer may be retrieved from an appropriate data repository associated with the IDE. Requirements may be selected or included for use based on a system generated or user generated criterion or filter.

Requirement data may be retrieved for each selected or included requirement. Requirement data may include a number, label and/or name that identifies the requirement, a priority, responsible personnel, developers or developer teams, a milestone (e.g., an upcoming milestone, a passed milestone, etc.), and/or a definition of relevant metrics.

A generated report may include an indication of the software development status. An indication of interest may indicate a change in the software development status over the course of a selected period of time or development phase. Software development report generation method 200 may include obtaining an indication of the software development status at the beginning of the selected period or phase (step 206), and at the end of the period or phase (step 208). The indication may be in the form of a metric that may be retrieved from an appropriate repository that can be associated with the IDE. In another implementation, an appropriate component or application of the IDE may be applied to the software being developed or to associated data in order to generate metric data.

A metric to be retrieved may be selected either automatically or by a user. Metrics may include changes to software, defects detected by a component of the IDE, test results from a test management component of the IDE; code coverage, code size, indications of code quality, and/or suspicious modifications of a software component (or suspicious commits) by a developer not responsible for that component. Detected defects may be limited to new defects, reopened defects, or repaired defects.

A metric may be expressed as a number appropriate to the metric. Defects may be expressed as a quantitative function of the number of times that defects, or a particular class of defects, occur. The number of times a particular type of defect occurs may be weighted by a weight assigned to that type of defect. The weight may be assigned on the basis of seriousness of the defect. Other metrics related to a number of occurrences, such as software changes, or a number of suspicious modifications or commits, may be similarly treated.

Metrics may be appropriately expressed as score or percentage of a desired score. These metrics may include test results, code quality, and/or code coverage.

Software development report generation method 200 may include calculating a change in an indication of the status during the selected period or phase (step 210). The change in status may be indicated as a function of change in a metric that is expressible numerically. A numerical difference (or quotient) of values of the numerical expression of the metric at the beginning and/or end of the selected period or phase may be calculated. Such a calculated difference (or quotient) may be normalized by an appropriate quantity (e.g., the value at the beginning of the period) or otherwise manipulated so as to yield a useful indication of the change in status.

Software development report generation method 200 may include generating a report based on retrieved and calculated data (step 212). The generated report may be configured to be displayed on a display or an output component of an input/output device 16 of a station 12. Software development report generation system 10 may display the generated report in an interactive format, such as a graphical user interface. A user may interact with the displayed report data so as to control which report data may be displayed, and in what manner.

In an embodiment in accordance with the invention, user interaction with the interactive report may cause a new report to be generated. Software development report generation system 10 may initially generate a general report in an interactive format. User interaction with the interactive format may generate a request for another report. A general report may include summarizing data for several projects. Selection of a project may result in generation of a more detailed report for that project. Further selection of a requirement, task, milestone, phase, developer, or other aspect of the project may result in a more specific report.

In accordance with an embodiment of the invention, an interactive report format may enable the user to request: display of an associated document, display data in the form of a graph or chart indicating a trend, and/or add or hide data columns or rows of a displayed table. An interactive report format may display relationships of an entity (e.g., requirement, software component, developer or team, document, defect, or test) whose details may be currently displayed with other entities. A user may interactively navigate among the displayed relationships in order to cause the display of details regarding a related entity.

An interactive report format may enable a user to initiate an action. A user interacting with the interactive report format may modify a project by initiating or modifying a task (e.g., reassign and/or or change completion status, etc.). A user may interact with the interactive report format to post a comment or to schedule a meeting among developers or supervisors.

Figure 3:
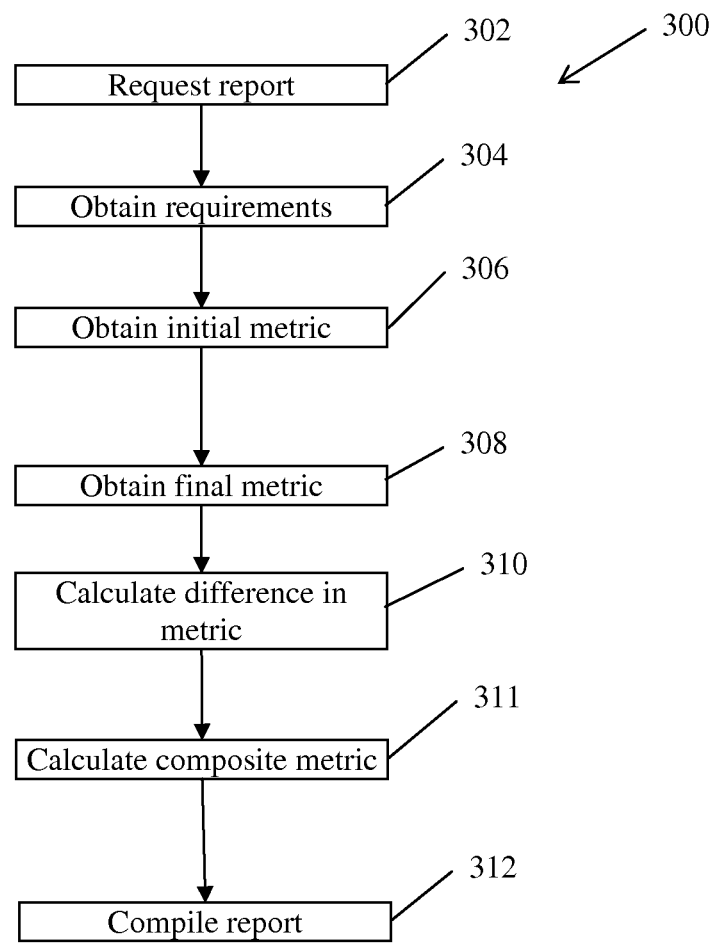
FIG. 3 shows a flowchart of an alternative method for software development report generation in accordance with an embodiment of the invention.

FIG. 3 shows a flowchart for a method of software development report generation in accordance with an embodiment of the invention. Steps 302-310 of software development report generation method 300 are similar to steps 202-210 of software development report generation method 200 (FIG. 2), and are described briefly. A user or system may request generation of a report (step 310). Software development report generation method 300 may include obtaining requirements (step 304) and initial and final metric from appropriate repositories or measurements (steps 306 and 308). A difference between initial and final metrics may be calculated (step 310).

Software development report generation method 300 may include calculating a composite metric (step 311). A composite metric may be calculated from several individual metrics. The values of one or more metrics may be input to an appropriate function or formula. The output value of that function or formula may be a single composite metric.

A composite metric may indicate an overall health of a project or software being developed may be based on a function of several other metrics. A composite health metric may enable a quick comparison between projects.

The composite metric may be formed by combining into a single metric a metric indicating a number of defects, another metric indicating a number of written lines of code, and/or another measure of the size of the software. A composite metric may indicate the number of defects per line of code. A composite metric may enable a quick comparison between developers or development teams.

The composite metric may be included together with other requirement and metric-related data in a generated report (step 312).

A generated report may be of several types.

A feature/requirement report may enable review of the status of a selected feature or requirement that may be implemented in the developed software. Initially displayed data may include data that may define or may identify the selected feature or requirement of the software being developed. Displayed data may also include metrics relevant to the selected feature or requirement. A user may select metrics to be displayed from a list of relevant metrics.

Feature or requirement data may include an identifying tag, a name or description, a priority, responsible user or supervisor, developer or team of developers assigned to the feature or requirement, and/or identification of a milestone.

Tasks related to the feature or requirement may each be displayed and/or listed together with summarizing data.

Metrics may include changes to the software, software defects, coverage of testing, test results, and/or health (composite metric). Displayed data may also include new defects and/or a change in number of new defects. Metric-related data over a user-defined period of time may be graphed. The user may select the data to be graphed.

Documents related to the selected feature or requirement may also be selected for display (e.g., a requirement analysis document).

A developer comparison report may enable reviewing or comparing the performances of various developers or teams of developers assigned to a project. Initially displayed data may include requirements to be implemented by a selected developer or team, and components assigned for maintenance by the selected developer or team. Developers assigned to a selected team may also be listed. Metrics relevant to each requirement or component assigned to the selected developer or team may be selected for display. Similarly, metric-related data may be graphed. Documents associated with the selected developer or team (e.g., notes of a team meeting) may be selected for display.

An unplanned changes (or rogue development) report may enable reviewing of software changes that were made that are not associated with a requirement. The report may also report changes made by a developer or team to a component that was not assigned to that developer or team. An unplanned changes report may display software changes that related to a selected project, component, and/or feature, but not related to any requirement. Detection of such unplanned changes may be limited to changes made during a user-defined and/or user-selected time period or development phase. In addition to the metrics described with regard to the feature/requirement report, metrics may include an indication of the size of the changes. Information displayed may include the developer or team who made the changes. Documents associated with the selected component may be selected for display.

A defect prioritization report may enable reviewing or assigning priorities to defects in the software being developed that have not yet been repaired. Defects related to a selected requirement or component may be displayed. Information related to a selected defect may be displayed. Information directly related to the defect may include an identification of the defect, the type of defect, a severity of the defect (e.g., related to impact on performance), a priority for repair, the related component, and/or the developer responsible for repairing the defect. Additional displayed data may include information related to the associated requirement, a target milestone, and related entities (e.g., defects, tests, requirements, components, sets of changes, files, etc.). A user may assign priorities to each defect, or may modify a previously assigned priority.

Software development report generation, according to embodiments of the invention, may be implemented in the form of software, hardware or a combination thereof.

Aspects of the invention, as may be appreciated by a person skilled in the art, may be embodied in the form of a system, a method or a computer program product. Similarly, aspects of the invention may be embodied as hardware, software or a combination of both. Aspects of the invention may be embodied as a computer program product saved on one or more computer readable medium (or mediums) in the form of computer readable program code embodied thereon.

For example, the computer readable medium may be a computer readable storage medium. A computer readable storage medium may be, for example, an electronic, optical, magnetic, electromagnetic, infrared, or semiconductor system, apparatus, or device, or any combination thereof.

Computer program code in embodiments of the invention may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

We claim:

1. A computer implemented method for reporting software development, the method comprising:
    extracting requirement data from a software development system, the requirement data defining a software development requirement during a predetermined period of time;
    extracting from the software development system an indication of a state of software development at the beginning of the predetermined period of time;
    extracting from the software development system an indication of a state of software development at the end of the predetermined period of time;
    calculating a change in the state of software development during the predetermined period of time; and
    generating at least one report that enables comparing the calculated change in the state of software development with the software development requirement, and the at least one report further identifying defects in developed software that is the subject of the software development, and identifying priorities assigned to the corresponding defects.

2. The method of claim 1, wherein the indication of the state of software development comprises a metric selected from a group including defects associated with a selected software component, test results, code coverage, and size of code.

3. The method of claim 1, further comprising computing a composite indication of a state of software development from a plurality of different indications of a state of software development, wherein the plurality of different indications include a metric indicating a number of defects in the developed software, and a metric indicating a size of the developed software.

4. The method of claim 1, wherein the at least one report comprises information displayed in an interactive format.

5. The method of claim 4, wherein the displayed information comprises information related to a selected item selected from a group including a selected requirement, a selected component, a selected developer, a selected team of developers, and a selected defect.

6. The method of claim 1, wherein the software development system comprises an integrated development environment.

7. The method of claim 1, wherein extracting the requirement data comprises receiving the requirement data from a remote processor via a network.

8. The method of claim 1, wherein the at least one report further indicates that a change has been made to the developed software that is not associated with the software development requirement.

9. The method of claim 1, wherein the at least one report further indicates that a change to the developed software has been made by a developer who was not assigned to make the change.

10. A computer program product stored on a non-transitory computer readable medium, the computer program including code for:

extracting requirement data from a software development system, the requirement data defining a software development requirement during a predetermined period of time;

extracting from the software development system an indication of a state of software development at the beginning of the predetermined period of time;

extracting from the software development system an indication of a state of software development at the end of the predetermined period of time;

calculating a change in the state of software development during the predetermined period of time; and generating at least one report that enables comparing the calculated change in the state of software development with the software development requirement, the at least one report further indicating that a first change has been made to developed software that is not associated with the software development requirement, or that a second change to the developed software has been made by a developer who was not assigned to make the second change, and the at least one report further identifying defects in developed software that is the subject of the software development, and identifying priorities assigned to the corresponding defects.

11. The non-transitory computer readable medium of claim 10, wherein the indication of the state of software development comprises a metric selected from a group including defects associated with a selected software component, test results, code coverage, and size of code.

12. The non-transitory computer readable medium of claim 10, wherein the computer program further includes code for computing a composite indication of a state of software development from a plurality of different indications of a state of software development, wherein the plurality of different indications include a metric indicating a number of defects in the developed software, and a metric indicating a size of the developed software.

13. The non-transitory computer readable medium of claim 10, wherein the at least one report comprises information displayed in an interactive format.

14. The non-transitory computer readable medium of claim 13, wherein the displayed information comprises information related to a selected item selected from a group including a selected requirement, a selected component, a selected developer, a selected team of developers, and a selected defect.

15. The computer program product of claim 10, wherein the at least one report further identifies defects in the developed software, and priorities assigned to the corresponding defects.

16. A data processing system comprising:

a processing unit in communication with a computer usable medium, wherein the computer usable medium contains a set of instructions executable on the processing unit to:

extract requirement data from a software development system, the requirement data defining a software development requirement during a predetermined period of time;

extract from the software development system an indication of a state of software development at the beginning of the predetermined period of time;

extract from the software development system an indication of a state of software development at the end of the predetermined period of time;

calculate a change in the state of software development during the predetermined period of time; and generate at least one report that enables comparing the calculated change in the state of software development with the software development requirement and the at least one report further identifying defects in developed software that is the subject of the software development, and identifying priorities assigned to the corresponding defects.

17. The system of claim 16, wherein the indication of the state of software development comprises a metric selected from a group including defects associated with a selected software component, test results, code coverage, and size of code.

18. The system of claim 16, configured to compute a composite indication of a state of software development from a plurality of different indications of a state of software development, wherein the plurality of different indications include a metric indicating a number of defects in the developed software, and a metric indicating a size of the developed software.

19. The system of claim 16, wherein the at least one report further indicates that a change has been made to the developed software that is not associated with the software development requirement.

20. The system of claim 16, wherein the at least one report further indicates a change to the developed software has been made by a developer who was not assigned to make the change.

* * * * *